United States Patent
Jang et al.

(10) Patent No.: US 9,065,624 B2
(45) Date of Patent: Jun. 23, 2015

(54) METHOD AND APPARATUS FOR DETERMINING A COOPERATIVE TERMINAL

(75) Inventors: Jiwoong Jang, Anyang-si (KR); Hyun-Woo Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 61 days.

(21) Appl. No.: 13/641,310

(22) PCT Filed: Apr. 29, 2011

(86) PCT No.: PCT/KR2011/003230
§ 371 (c)(1),
(2), (4) Date: Oct. 15, 2012

(87) PCT Pub. No.: WO2011/139054
PCT Pub. Date: Nov. 10, 2011

(65) Prior Publication Data
US 2013/0034038 A1 Feb. 7, 2013

Related U.S. Application Data

(60) Provisional application No. 61/330,400, filed on May 3, 2010.

(51) Int. Cl.
| | |
|---|---|
| H04L 5/00 | (2006.01) |
| H04B 7/02 | (2006.01) |
| H04W 68/00 | (2009.01) |
| H04W 88/04 | (2009.01) |
| H04W 52/36 | (2009.01) |
| H04W 52/38 | (2009.01) |

(52) U.S. Cl.
CPC ............... *H04L 5/006* (2013.01); *H04B 7/022* (2013.01); *H04B 7/026* (2013.01); *H04L 5/0035* (2013.01); *H04W 68/00* (2013.01); *H04W 88/04* (2013.01); *H04W 52/365* (2013.01); *H04W 52/38* (2013.01)

(58) Field of Classification Search
CPC ...... H04B 7/026; H04B 7/024; H04L 5/0035; H04L 5/0033; H04L 2001/0097; H04L 1/1867; H04L 5/0091; H04L 1/004; H04L 1/16; H04W 68/00; H04W 88/022; H04W 4/006; H04W 84/047; H04W 88/04; H04W 16/26; H04W 52/0225; H04W 52/0251; H04W 72/121; H04W 72/1289
USPC ......... 370/312, 328, 329, 315, 310, 235, 322, 370/336, 338; 455/42.1, 500, 7, 11.1, 517, 455/522
See application file for complete search history.

(56) References Cited

U.S. PATENT DOCUMENTS

| | | |
|---|---|---|
| 2007/0002766 A1 | 1/2007 | Park et al. |
| 2007/0165581 A1* | 7/2007 | Mehta et al. .................. 370/338 |

(Continued)

FOREIGN PATENT DOCUMENTS

| | | |
|---|---|---|
| CN | 101399583 A | 4/2009 |
| WO | WO 2009/131867 A2 | 10/2009 |

OTHER PUBLICATIONS

Nosratinia et al., "Cooperative Communication in Wireless Networks", Adaptive Antennas and MIMO Systems for Wireless Communications, IEEE, Oct. 2004, pp. 74-80.

*Primary Examiner* — Un C Cho
*Assistant Examiner* — Oussama Roudani
(74) *Attorney, Agent, or Firm* — Birch, Stewart, Kolasch & Birch, LLP

(57) ABSTRACT

According to the disclosure of the present description, a method in which a base station determines a cooperative terminal is provided. The method comprises: a step of receiving status information from one or more terminals from among terminals that can cooperate with the base station in cooperative transmission; a step of determining, on the basis of the status information and upon receipt of a cooperative communication request from one terminal from among the cooperative terminals, a terminal which will cooperate with a terminal that has requested a cooperation; and a step of notifying the cooperative terminal of the terminal that has requested a cooperation.

15 Claims, 10 Drawing Sheets

(56) References Cited

U.S. PATENT DOCUMENTS

| | | |
|---|---|---|
| 2008/0144562 A1 | 6/2008 | Draper et al. |
| 2010/0008283 A1 | 1/2010 | Chitrapu et al. |
| 2010/0316002 A1* | 12/2010 | Nagaraja ........................ 370/329 |
| 2011/0051655 A1* | 3/2011 | Blankenship et al. ......... 370/315 |
| 2012/0020213 A1* | 1/2012 | Horneman et al. ............ 370/231 |
| 2012/0309431 A1* | 12/2012 | Bodog ........................ 455/456.6 |

* cited by examiner (a)

(b)

(a)

(b)

(a)

(b)

METHOD AND APPARATUS FOR DETERMINING A COOPERATIVE TERMINAL

This application is the National Phase of PCT/KR2011/003230 filed on Apr. 29, 2011, which claims priority under 35 U.S.C. 119(e) to U.S. Provisional Application No. 61/330,400 filed on May 3, 2010, all of which are hereby expressly incorporated by reference into the present application.

TECHNICAL FIELD

The present invention relates to cooperative communication and, more particularly, to a method of determining a terminal which will cooperate with a terminal requesting cooperative communication to transmit data, and a base station and terminal therefor.

BACKGROUND ART

With development of communication technology, the number of radio access users has been steadily increased and thus there is a limit in a bandwidth of a wireless network. Demands on high-quality multimedia services have increased and quality of service (QoS) needs to be guaranteed in order to successfully transmit real-time multimedia data such as VoIP or real-time video. In addition, in a situation in which demands on mass multimedia services has increased, in order to provide predetermined QoS at low cost, band efficiency should be maximized. For band efficiency improvement, average throughput of a cell and a maximum radio data transfer rate should be increased. Accordingly, Multiple-input multiple-output (MIMO) technology has been proposed.

Multiple-input multiple-output (MIMO) technology refers to a method of employing multiple transmit antennas and multiple receive antennas so as to improve transmission/reception data efficiency, unlike a conventional method using one transmit antenna and one receive antenna. That is, the MIMO technology refers to a technology of utilizing multiple antennas in a transmitting end and a receiving end so as to increase capacity and improve performance and may also be referred to as a multi-antenna technology.

In the MIMO technique, a single antenna path is not used for receiving one message. Instead, in the MIMO technique, data fragments received via several antennas are collected and combined so as to complete data. If the MIMO technique is used, a data transfer rate may be improved in a specific range or system coverage may be increased with respect to a specific data transfer rate. In addition, this technique is a next-generation mobile communication technique which may be widely used in a mobile communication terminal, a repeater and the like. Therefore, the MIMO technique is attracting considerable attention as a next-generation technique which can overcome a limit in transmission amount of conventional mobile communication using a single antenna by data communication extension.

In general, when a transport channel is in a deep fading state, if another version or a replica of a transmitted signal is not additionally transmitted, it is difficult for a receiver to determine a transmitted signal. A source corresponding to another version or a replica of a transmitted signal is referred to as diversity, which is a very important factor contributing to reliable transmission of a wireless channel.

Use of diversity may maximize data transfer capacity or transfer reliability. A system for performing diversity using multiple transmit antennas and multiple receive antennas is also called a MIMO system or a multi-antenna system.

In order to overcome performance deterioration by channel fading of wireless communication, research into a spatial diversity scheme using a MIMO system has been conducted.

MIMO provides advantages such as high data transfer rate, low error rate and channel capacity increase by using two or more antennas in a transmitter and a receiver.

However, in spite of the advantages of the MIMO system, it is impossible to implement a MIMO system in uplink due to constraints such as size, weight and hardware complexity.

As an alternative scheme, a cooperative diversity scheme has been proposed. The cooperative diversity scheme can obtain advantages such as spatial diversity gain, error rate decrease and channel capacity increase of a MIMO system even when each terminal has one or more antennas as a minimum in a wireless communication network. The cooperative diversity scheme can obtain the advantages of the MIMO system even when a terminal has one or more antennas, by placing a relay or a femtocell and sharing an antenna of the relay and resources such as a frequency band between peripheral terminals so as to form a virtual MIMO system.

The cooperative diversity scheme uses a separate relay.

However, there is a need for a method of performing cooperative communication using terminals without a separate relay and a method of determining terminals for transmitting data using a cooperative diversity scheme with another terminal. Thus, an inter-terminal cooperative communication scheme, that is, a client cooperation (cooperative communication) scheme, has been proposed.

The client cooperation scheme refers to a method of enabling two or more terminals each having a single or multiple antennas to share resources thereof such that data reaches a destination via multiple paths, that is, a communication method of enabling any one terminal to transmit data to another terminal and a base station or only another terminal and enabling another terminal to transmit the data to the base station.

DISCLOSURE

Technical Problem

An object of the present invention is to provide a method of grouping terminals for transmitting cooperative communication. More specifically, an object of the present invention is to provide a method of determining, at a base station (BS), a cooperative communication relationship between a plurality of terminals and a procedure of providing information necessary for a process of determining a transmission relationship. Another object of the present invention is to provide a BS and terminal capable of performing the method.

Technical Solution

The object of the present invention can be achieved by providing a method of determining a cooperative terminal at a base station (BS), including receiving status information from one or more cooperative communication capable terminals; determining a cooperative terminal which will cooperate with a cooperation requesting terminal based on the received status information, if receiving a cooperative communication request from the cooperation requesting terminal among the cooperative communication terminals, the cooperative terminal cooperating with the cooperation requesting terminal to transmit data of the cooperation requesting terminal; and notifying the cooperation requesting terminal of the cooperative terminal.

Before receiving the status information, the method may further include, transmitting, to the cooperative communication capable terminals, one or more of a list of the cooperative communication capable terminals, a list of terminal(s) requesting cooperative communication, a list of items to be collected among the status information, and information associated with a radio channel.

The information associated with the radio channel may include one or more of a list of radio access technology (RAT) to be used in inter-terminal communication, information about minimum power level for responding, information about path loss, information about a channel or a signal structure to be used to search for a neighboring terminal or a neighboring signal, and information about a reference channel, a signal structure or a timing value for reference timing for timing information configuration.

The status information may include one or more of information about power of each cooperative communication capable terminal, information about channel status, information about performance, information about mobility, movement direction and speed, information about a current location, information about probing result of a peripheral terminal, and information about channel status of a multi-radio access technology (RAT).

The information about power may include one or more of remaining battery amount, current power consumption amount, processing power consumed for transmission/reception, presence/absence of an external power source and a power headroom value.

The information about channel status may include one or more of noise and interference level of all or part of downlink, noise and interference level of all or part of uplink, value set for timing advance of a terminal, and path loss to the BS.

The information about performance may include modulation and coding scheme (MCS) level which can support transmission and reception, information as to whether cooperative communication is currently being performed, and available resources for cooperative communication.

The information about the channel status of the multi-RAT may include one or more of noise and interference level of each channel, channel load state, and buffer state.

The receiving the status information may include periodically receiving the status information from one or more of the cooperative communication capable terminals at a predetermined time interval.

The time interval may be broadcast or multicast to the cooperative communication capable terminals.

The receiving the status information may include receiving the status information only when the terminal initially enters a cell, if the cooperative communication capable terminal in a stationary state has an external power source.

Before receiving the status information, the method may further include receiving a cooperative communication request from one or more of the cooperative communication capable terminals; and transmitting a status information request to a terminal other than the cooperation requesting terminal among the cooperative communication capable terminals.

According to another aspect of the present invention, there is provided a base station (BS) including: a transmission/reception unit configured to receive status information and a cooperative communication request from one or more cooperative communication capable terminals; and a controller configured to control the transmission/reception unit to determine a cooperative terminal based on the status information received from the transmission/reception unit, the cooperative terminal cooperating with a cooperation requesting terminal to transmit data including data transmitted by the cooperation requesting terminal, wherein the transmission/reception unit transmits a notification about the cooperative terminal to the cooperation requesting terminal.

The controller may control the transmission/reception unit to periodically receive the status information from one or more of the cooperative communication terminals at a predetermined time interval.

The transmission/reception units may broadcast or multicast information about the time interval and the information about the time interval. The information may be used for the cooperative communication capable terminals to periodically transmit the status information.

The transmission/reception unit may transmit a status information request to the cooperative communication capable terminals which are located in a cell, and receive the status information from one or more terminals which receive the status information request, under control of the controller, if the cooperative communication request is received, and the controller may determine the cooperative terminal based on the received status information.

According to another aspect of the present invention, there is provided a terminal which cooperates with another terminal to transmit data to a base station (BS), including: a transmission/reception unit configured to transmit one or more of status information and a cooperative communication request to the BS, the status information being considered when the BS determines a cooperative terminal, the cooperative terminal cooperating with a cooperation requesting terminal to transmit data including data transmitted by the cooperation requesting terminal to the BS; and a controller configured to control the transmission/reception unit to collect the status information, wherein the transmission/reception unit transmits the collected status information and receives a notification about the determined cooperative terminal.

The controller may control the transmission/reception unit to collect and transmit the status information to the BS if a status information transmission request is received from the BS.

Advantageous Effects

According to the embodiments of the present invention, a base station may efficiently determine a cooperation requesting terminal and a cooperative terminal by receiving current status information of each terminal.

BEST MODE

Figure 1:
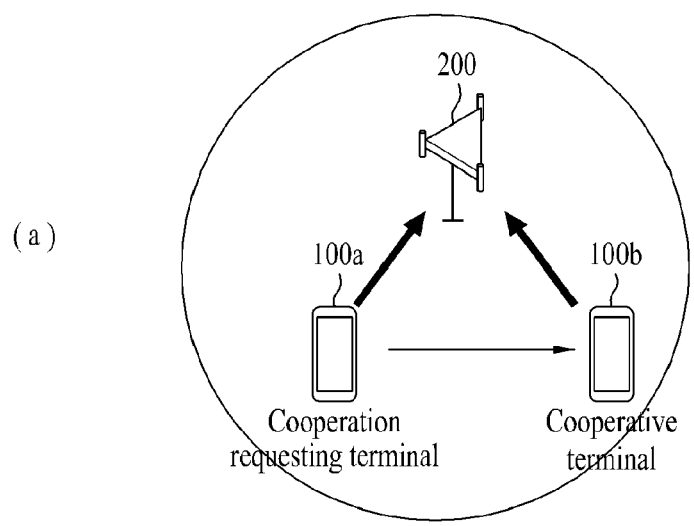
FIG. 1 is a diagram showing the concept of cooperative communication.
Figure 1:
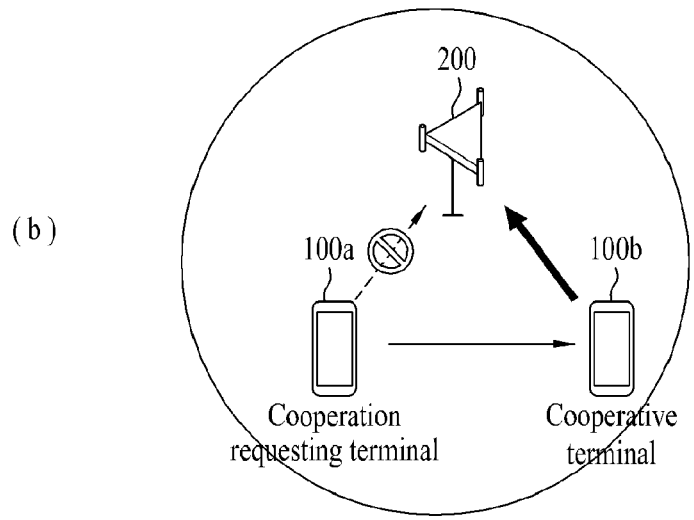

The present invention is applicable to client cooperation (cooperative communication). Client cooperation refers to a method of enabling two or more terminals each having a single or multiple antennas to share resources thereof such that data reaches a destination via multiple paths, that is, a communication method of enabling any one terminal to transmit data to another terminal and a base station (BS) or only another terminal and enabling another terminal to transmit the data to the BS.

However, the present invention is not limited thereto and is applicable to all communication systems and methods and other systems to which the technical scope of the present invention is applicable.

Technical terms used in this specification are used merely to illustrate specific embodiments, and it should be understood that they are not intended to limit the present disclosure. So long as not defined otherwise, all terms used herein including technical terms may have the same meaning as those generally understood by an ordinary person skilled in the art to which the present disclosure pertains, and should not be construed in an excessively comprehensive manner or an extremely restricted manner. In addition, if a technical term used in the description of the present disclosure is an erroneous term that fails to clearly express the idea of the present disclosure, it should be replaced by a technical term that can be properly understood by those skilled in the art. In addition, general terms used in the description of the present disclosure should be construed according to definitions in dictionaries or according to context, and should not be construed in an excessively restrained manner.

A singular representation may include a plural representation unless the context clearly indicates otherwise. It will be understood that the terms 'comprising', 'include', etc., when used in this specification, specify the presence of several components or several steps and part of the components or steps may not be included or additional components or steps may be further included.

The terms "module" and "unit" described in the specification are used interchangeably to easily describe the specification and are not distinguished from each other.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

It will be understood that when an element is referred to as being "connected with" another element, the element can be directly connected with the other element or intervening elements may also be present. In contrast, when an element is referred to as being "directly connected with" another element, there are no intervening elements present.

Exemplary embodiments of the present invention will be described below in detail with reference to the accompanying drawings in which the same reference numbers are used throughout this specification to refer to the same or like parts.

In describing the present invention, a detailed description of known functions and configurations will be omitted when it may obscure the subject matter of the present invention. The accompanying drawings are used to help easily understand the technical idea of the present invention and it should be understood that the idea of the present invention is not limited by the accompanying drawings. The idea of the present invention should be construed to extend to any alterations, equivalents and substitutions besides the accompanying drawings.

Although the term 'terminal' is illustrated in the drawings, the terminal may be called a User Equipment (UE), a Mobile Equipment (ME), a Mobile Station (MS), a User Terminal (UT), a Subscriber Station (SS), a wireless device, a handheld device, or an Access Terminal (AT). The terminal may be a type of portable equipment having a communication function, such as a cellular phone, a Personal Digital Assistant (PDA), a smart phone, a wireless modem, and a notebook, or may be a type of fixed equipment, such as a PC and a vehicle-mounted device.

FIG. 1 is a diagram showing the concept of cooperative communication.

Referring to FIG. 1, a base station (BS) 200 and terminals are shown. At this time, for example, if channel status is bad or if sufficient resources are not allocated, a terminal 100*a* may request cooperation from another terminal 100*b* and the terminal 100*b* may transmit data of the terminal 100*a* to the BS 200 in response to the request for cooperation.

At this time, as shown in FIG. 1, a terminal requesting cooperation is referred to as a cooperation requesting terminal and a terminal which responds to the request for cooperation is referred to as a cooperative terminal.

The cooperation requesting terminal may be called a cooperation initiating terminal and the cooperative terminal may be called a cooperative communication terminal or a cooperation providing terminal.

In addition, in FIG. 1, the number of cooperative terminal 100*b* for transmitting data of the terminal 100*a* is one in response to the request for cooperation. If the number of cooperative terminal 100*b* is limited to one, it is advantageous in that processing delay is reduced and implementation is relatively easy. However, since the number of terminals is small, combining gain is also low. In addition, a link or channel status (or quality) between the cooperative terminal 100*b* and the BS 200 may not be good, and thus a transfer success rate may be relatively low.

In FIG. 1(*a*), the cooperation requesting terminal 100*a* transmits data to the terminal 100*b* and also transmits the data to the BS 200. If the terminal 100*b* transmits the data to the BS 200, the BS may additionally obtain combining gain.

In contrast, in FIG. 1(*b*), the cooperation requesting terminal 100*a* transmits data to the terminal 100*b* but does not transmit the data to the BS 200.

Figure 2:
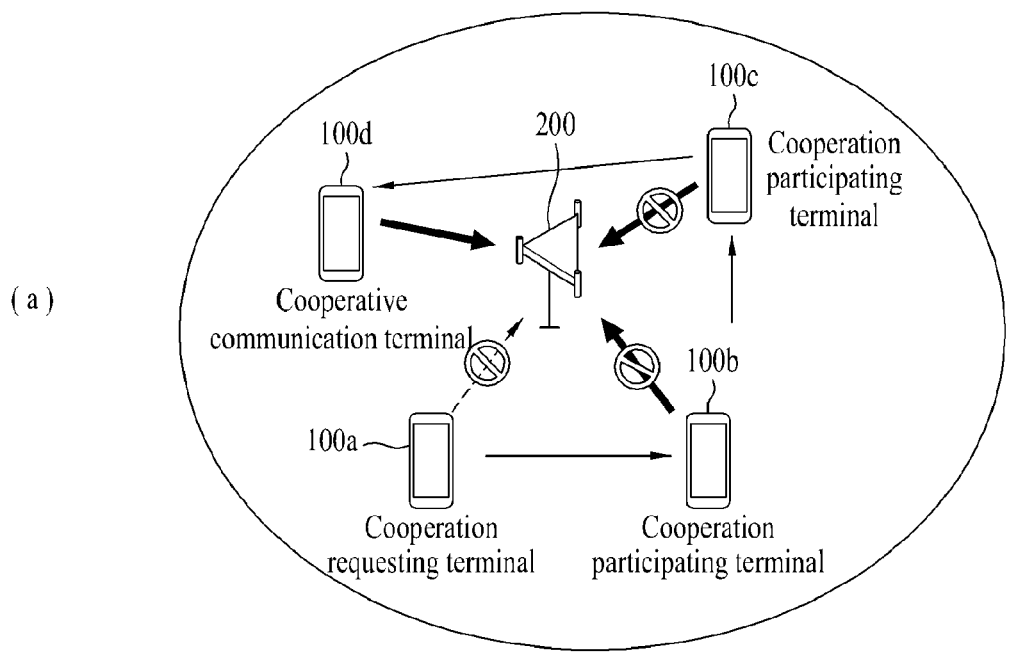
FIG. 2 is a diagram showing another concept of cooperative communication.
Figure 2:
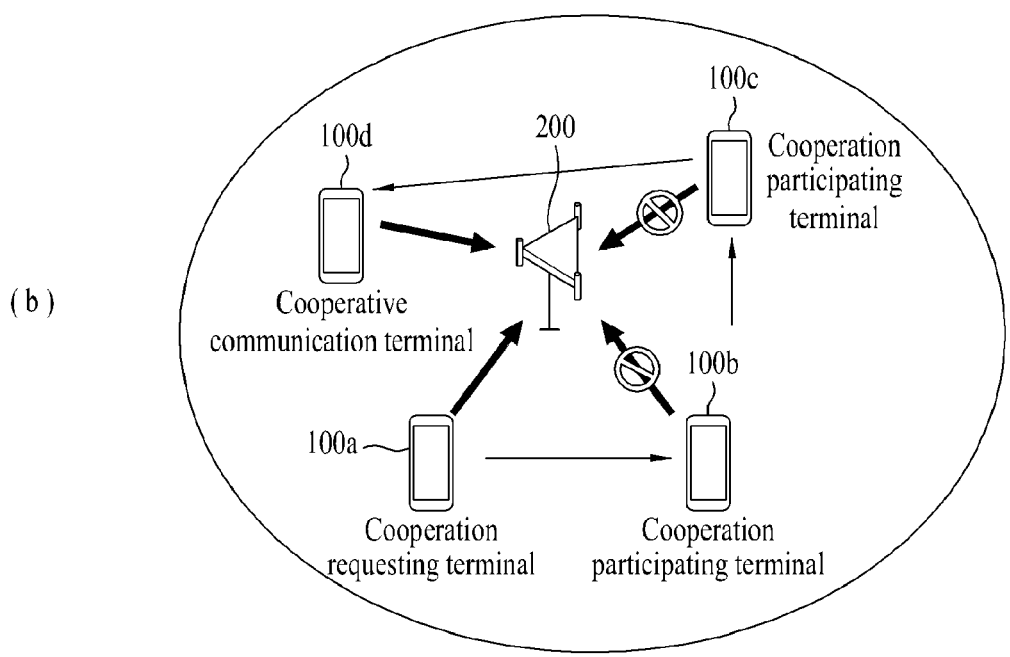

FIG. 2 is a diagram showing another concept of cooperative communication.

As can be seen from FIG. 2, a BS 200 and a plurality of terminals 100*a*, 100*b*, 100*c* and 100*d* are shown. At this time, for example, if channel status is bad or resources are not sufficiently allocated, the terminal 100*a* may request cooperation from the terminal 100*b*, the terminal 100*b* may request cooperation from the terminal 100*c* and the terminal 100*c* may request cooperation from the terminal 100*d*.

Only one of the terminals 100*b*, 100*c* and 100*d* may transmit the data of the terminal 100*a* to the BS 200 in response to the request for cooperation.

As shown in FIG. 2, a terminal requesting cooperation is referred to as a cooperation requesting terminal, terminals 100b, 100c and 100d which participate in cooperation are referred to as cooperation participating terminals, and a terminal which participates in cooperation and actually transmits data is referred to as a cooperative communication terminal 100d.

The cooperation requesting terminal may also be called a cooperation initiating terminal. The cooperative communication terminal may also be called a cooperative terminal or a cooperation providing terminal.

In FIG. 2(a), the number of terminals which transmit data of the terminal 100a to the BS 200 among the plurality of cooperation participating terminals 100b, 100c and 100d which respond to the request for cooperation is one. At this time, the cooperation requesting terminal 100a does not transmit the data to the BS 200.

The method of enabling only one of the plurality of cooperation participating terminals 100b, 100c and 100d, which respond to the request for cooperation to transmit the data of the cooperation requesting terminal 100a to the BS 200, has advantages that a terminal having the best channel quality or link with the BS 200 is selected and the data is transmitted via the terminal, thereby ensuring that the data is successfully transmitted. However, since the data is sequentially transmitted to the plurality of cooperation participating terminals 100b, 100c and 100d, delay may occur. Since the number of terminals which transmit the data of the terminal 100a to the BS 200 is only one, combining gain which may be additionally obtained is low.

In FIG. 2(b), the cooperation requesting terminal 100a transmits data to the BS 200 and the cooperative communication terminal 100d transmits the data of the cooperation requesting terminal 100a to the BS 200.

Figure 3:
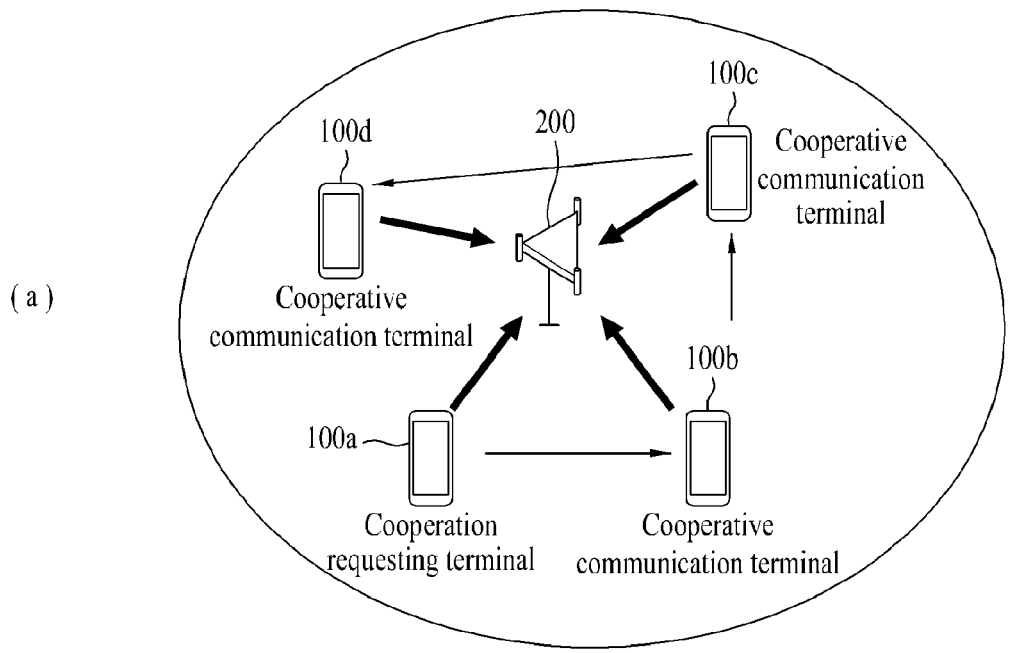
FIG. 3 is a diagram showing another concept of the cooperative communication.
Figure 3:
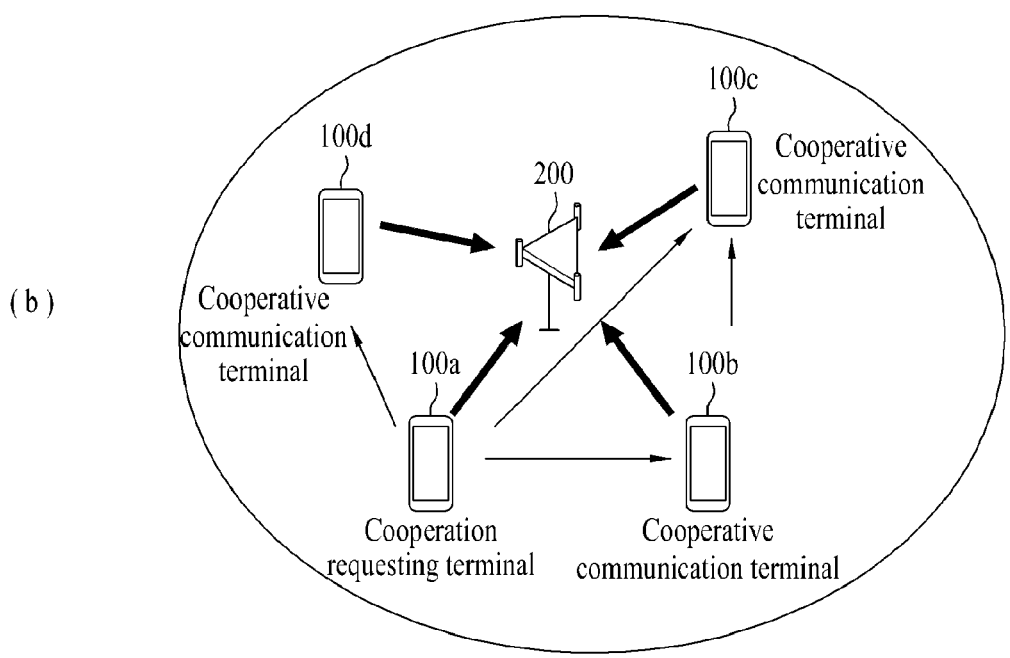

FIG. 3 is a diagram showing another concept of the cooperative communication.

Referring to FIG. 3(a), a BS 200 and a plurality of terminals 100a, 100b, 100c and 100d are shown. In this case, for example, if channel status is bad or resources are not sufficiently allocated, the terminal 100a may request cooperation from the terminal 100b, the terminal 100b may request cooperation from the terminal 100c and the terminal 100c may request cooperation from the terminal 100d.

One or more terminals of the several terminals 100b, 100c and 100d may transmit the data of the terminal 100a to the BS 200 in response to the request for cooperation.

In FIG. 3(a), several terminals 100b, 100c and 100d transmit the data of the terminal 100a to the BS 200 in response to the request. Accordingly, in FIG. 3(a), the terminals 100b, 100c and 100d are referred to as "cooperative communication terminals"

As can be seen from FIG. 3(b), for example, if channel status is bad or resources are not sufficiently allocated, the terminal 100a may request cooperation from the terminals 100b, 100c and 100d.

A plurality of terminals among the several terminals 100b, 100c and 100d may transmit the data of the terminal 100a to the BS in response to the request for cooperation.

The method of enabling the plurality of terminals to transmit the data of the terminal 100a to the BS has an advantage that a transfer success rate is significantly increased, but has disadvantages that implementation is complex and delay may occur in cooperative communication.

The conventional cooperative communication has been performed on the assumption that the BS or the terminal requesting cooperative communication is aware of information necessary for determining a cooperative terminal. Therefore, research on a method of transmitting information necessary to determine terminals which participate in cooperative communication is relatively insufficient.

In addition, determining the cooperative terminal in the conventional cooperative communication has mainly focused upon a data transfer rate (throughput) and a method of determining a terminal which most improves a data transfer rate as compared to single transmission as a cooperative terminal was used. Therefore, information necessary for cooperative communication was only channel quality of terminals, which support cooperative communication, with the BS. However, many variables to be considered may be present in addition to channel quality. For example, there is a limitation in power which may be used by the terminals in the network. And, for example, cooperative communication is already being performed. Thus, there is a need for research on how the BS collects this information.

Due to the characteristics of the modern mobile communication apparatus which has gradually become complicated, there is a limitation in, at the BS, predicting the status of each terminal via information received in a long term and determining a cooperative terminal. Therefore, it is necessary to receive the status information of each terminal from the terminals which support cooperative communication. In addition, the BS may request such status information from the terminal as necessary.

Figure 4:
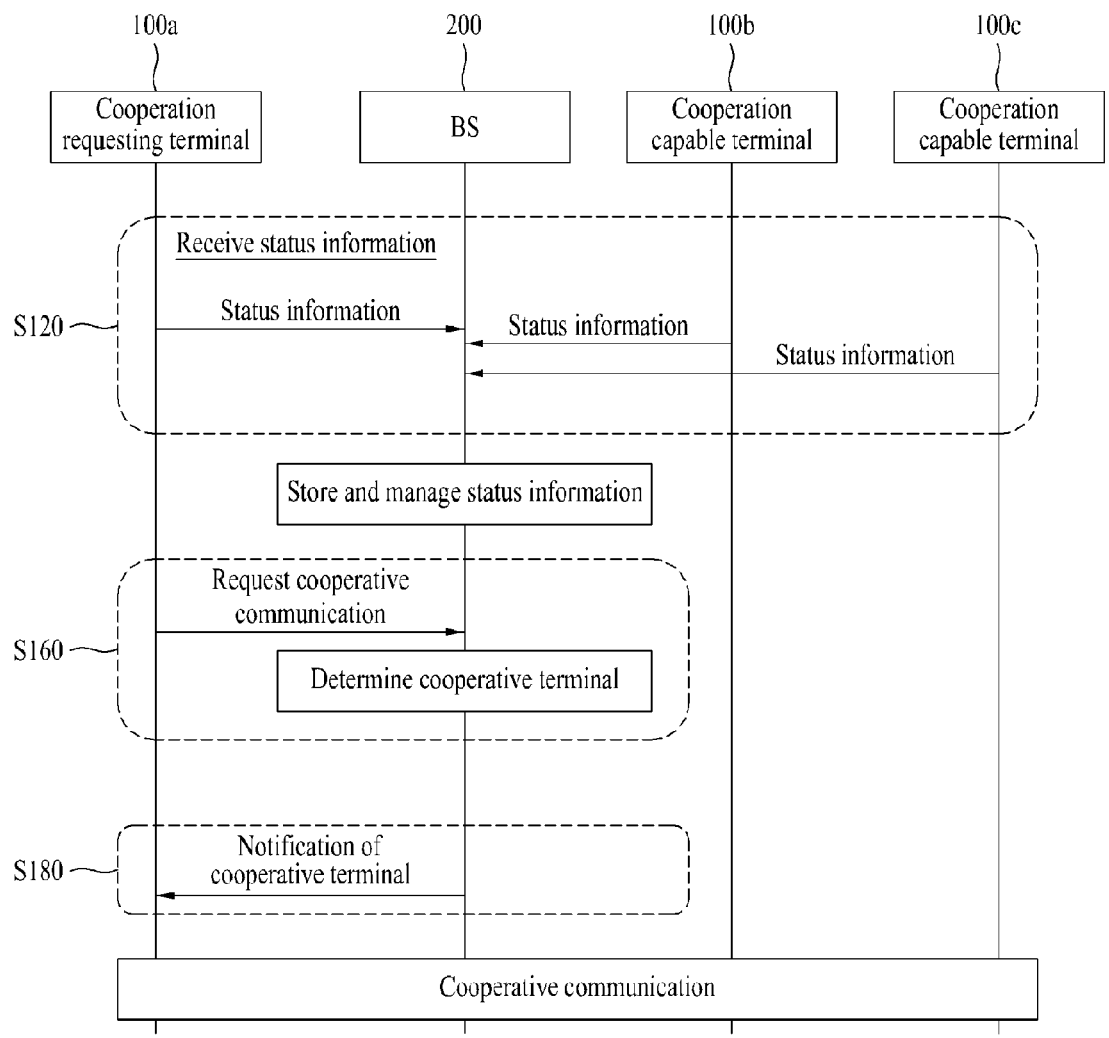
FIG. 4 is a diagram showing a method of, at a base station, receiving status information of each terminal and determining a cooperative terminal for a cooperation requesting terminal according to an embodiment of the present invention.

FIG. 4 is a diagram showing a method of, at a BS, receiving status information of each terminal and determining a cooperative terminal for a cooperation requesting terminal according to an embodiment of the present invention.

For convenience of description, it is assumed that three cooperative communication capable terminals 100a, 100b and 100c are located in the cell of the BS 200.

The BS 200 may receive the status information of each terminal from the cooperative communication capable terminals 100a, 100b and 100c located in the cell (S120). The status information is considered when determining the cooperative terminal and may include one or more of the followings:

information about power of each cooperation capable terminal,
information about channel status,
information about performance,
information about mobility, movement direction and speed,
information about current location,
information about probing result of peripheral terminals, and
information about the channel status of multi-radio access technology (RAT).

The information about power may include one or more of the followings:
remaining battery amount,
current power consumption amount,
processing power consumed for transmission/reception,
presence/absence of an external power source, and
Power headroom value.

The information about channel status may include one or more of the followings:
noise and interference level of all or part of downlink,
noise and interference level of all or part of uplink,
value set for timing advance of the terminal, and
path loss to the BS.

The information about performance may include one or more of the followings:
modulation and coding scheme (MCS) level which can support transmission and reception, information as to whether cooperative communication is currently being performed, and
available resources for cooperative communication.

The information about the channel status of the multi-RAT may include one or more of the followings:
noise and interference level of each channel,
channel load state, and
buffer state.

The BS 200 may receive the status information using existing channels or via separately defined channels.

The BS 200 may receive the status information together with one or more pieces of control information when receiving specific control information.

The BS 200 may store and manage the status information.

If a request for cooperative communication is received from any one terminal 100*a* among the cooperative communication capable terminals at arbitrary time point, the BS 200 may determine a terminal which will cooperate with the cooperation requesting terminal 100*a* based on the status information which has been stored and managed (S160). In this case, the BS 200 may preferably determine the cooperative terminal based on the status information transmitted by terminals, such as remaining battery amount of the terminal, mobility of each terminal, etc., in addition to channel quality.

The BS 200 may configure, change and manage an algorithm for determining a cooperative terminal from the status information. For example, if it is determined that a specific terminal (e.g., 100*b*) is most suitable for cooperative communication with the cooperation requesting terminal 100*a* according to any one predetermined algorithm, the specific terminal (e.g., 100*b*) may be determined as the terminal which will cooperate with the cooperation requesting terminal 100*a*.

If a cooperative terminal is determined, the BS 200 may transmit a notification about the determined cooperative terminal to the cooperation requesting terminal (S180). According to the above example, the BS may notify the cooperation requesting terminal 100*a* of the determined cooperative terminal 100*b*.

The notification may include an ID, location information, etc. of the cooperative terminal 100*b*.

The cooperation requesting terminal 100*a*, which receives the notification, cooperates with the cooperative terminal 100*b* and transmits data to the BS. The cooperative terminal 100*b* may transmit data including the data of the cooperation requesting terminal 100*a* to the BS 200.

Figure 5:
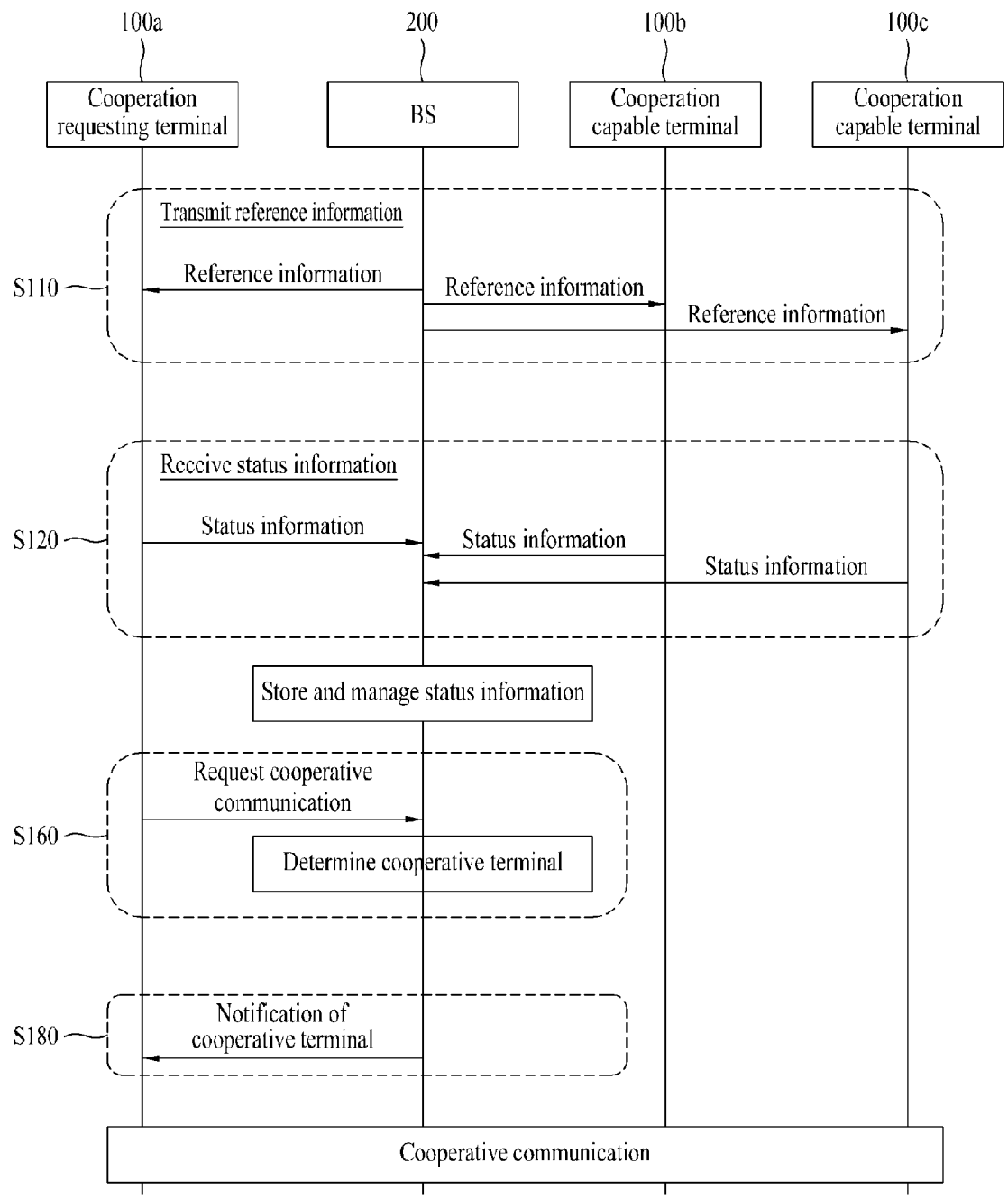
FIG. 5 is a diagram showing a modified example of the method shown in FIG. 4.

FIG. 5 is a diagram showing a modified example of the method shown in FIG. 4.

The BS 200 may transmit one or more of the following reference information to be referred to when the cooperation capable terminals 100*a*, 100*b* and 100*c* in the cell collect the status information (S110):
list of cooperative communication capable terminals,
list of terminals requesting cooperative communication,
list of items to be collected among the status information, and
information associated with a radio channel.

The list of the items to be collected among the status information may be transmitted in the form of a bitmap.

The information associated with the radio channel may include one or more of the followings:
list of RATs to be used in inter-terminal communication,
information about minimum power level for responding,
information about path loss,
information about a channel or a signal structure to be used for searching for a neighboring terminal or a neighboring signal, and
information about a reference channel, a signal structure or a timing value of reference timing for timing information configuration.

For example, the "list of items to be collected among the status information" of the reference information may be configured to only include presence/absence of an external power source and mobility in the status information to be received from the cooperation capable terminals 100*a*, 100*b* and 100*c*.

The cooperation capable terminals 100*a*, 100*b* and 100*c*, which receive the reference information, may collect the status information of each terminal and transmit the status information to the BS 200 according to the reference information (S120). The terminals 100*a*, 100*b* and 100*c* may transmit the status information using an existing channel or may transmit the status information using a separately defined channel. The terminals 100*a*, 100*b* and 100*c* may transmit the status information along with one or more pieces of control information when specific control information is transmitted.

The subsequent process is the same as described above with reference to FIG. 4.

Figure 6:
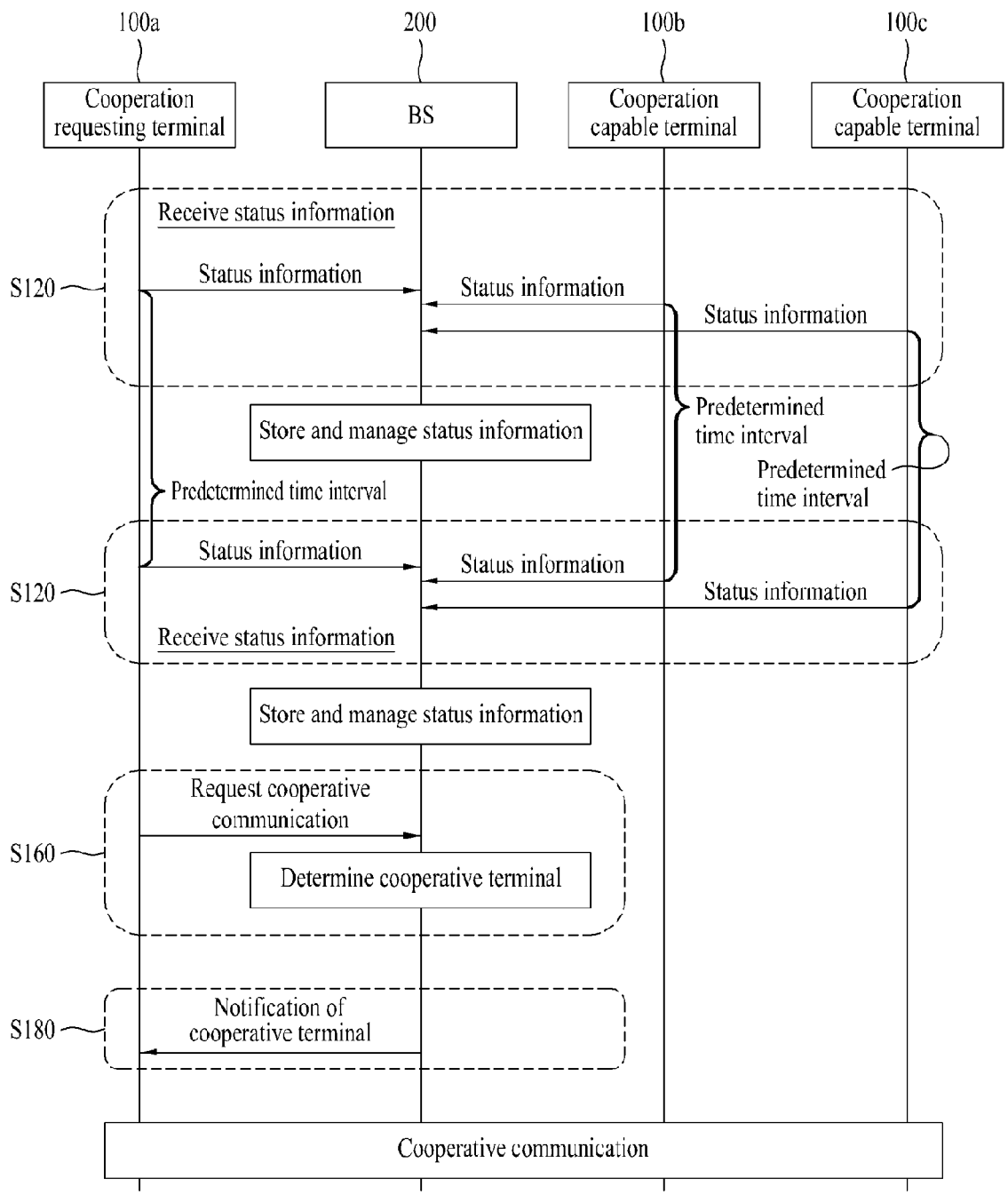
FIG. 6 is a diagram showing another modified example of the method shown in FIG. 4.

FIG. 6 is a diagram showing another modified example of the method shown in FIG. 4.

The status information of the cooperation capable terminals 100*a*, 100*b* and 100*c* is periodically received at a predetermined time interval (period) (S120). The BS 200 may receive the status information using an existing channel or a separately defined channel. The BS 200 may receive the status information along with one or more pieces of control information when specific control information is received. In this case, the BS 200 may not separately transmit a status information request to the cooperation capable terminals 100*a*, 100*b* and 100*c*. The BS 200 may store and manage the received status information.

The time interval may be set by the BS 200 or the cooperation capable terminals 100*a*, 100*b* and 100*c*.

If a cooperative communication request is received from any one 100*a* of the cooperative communication capable terminals 100*a*, 100*b* and 100*c* at a certain time, the BS 200 may determine a terminal which will cooperate with the cooperation requesting terminal 100*a* based on the status information which has been stored and managed (S160). In this case, the BS 200 may preferably determine the cooperative terminal based on the status information transmitted by terminals, such as remaining battery amount of the terminal, mobility of each terminal, etc., as well as channel quality.

The BS 200 may configure, change and manage an algorithm for determining a cooperative terminal from the status information. For example, if it is determined that a specific terminal (e.g., 100*b*) is most suitable for cooperative communication with the cooperation requesting terminal 100*a* according to any one predetermined algorithm, the specific terminal (e.g., 100*b*) may be determined as the terminal which will cooperate with the cooperation requesting terminal 100*a*.

If the cooperative terminal is determined, the BS 200 may transmit a notification about the determined cooperative terminal to the cooperation requesting terminal (S180). According to the above example, the BS may notify the cooperation requesting terminal 100*a* of the determined cooperative terminal 100*b*.

The notification may include an ID, location information, etc. of the cooperative terminal 100*b*.

The cooperation requesting terminal 100*a* which receives the notification cooperates with the cooperative terminal 100*b* and transmits data to the BS. The cooperative terminal 100*b* may transmit data including the data of the cooperation requesting terminal 100*a* to the BS 200.

Figure 7:
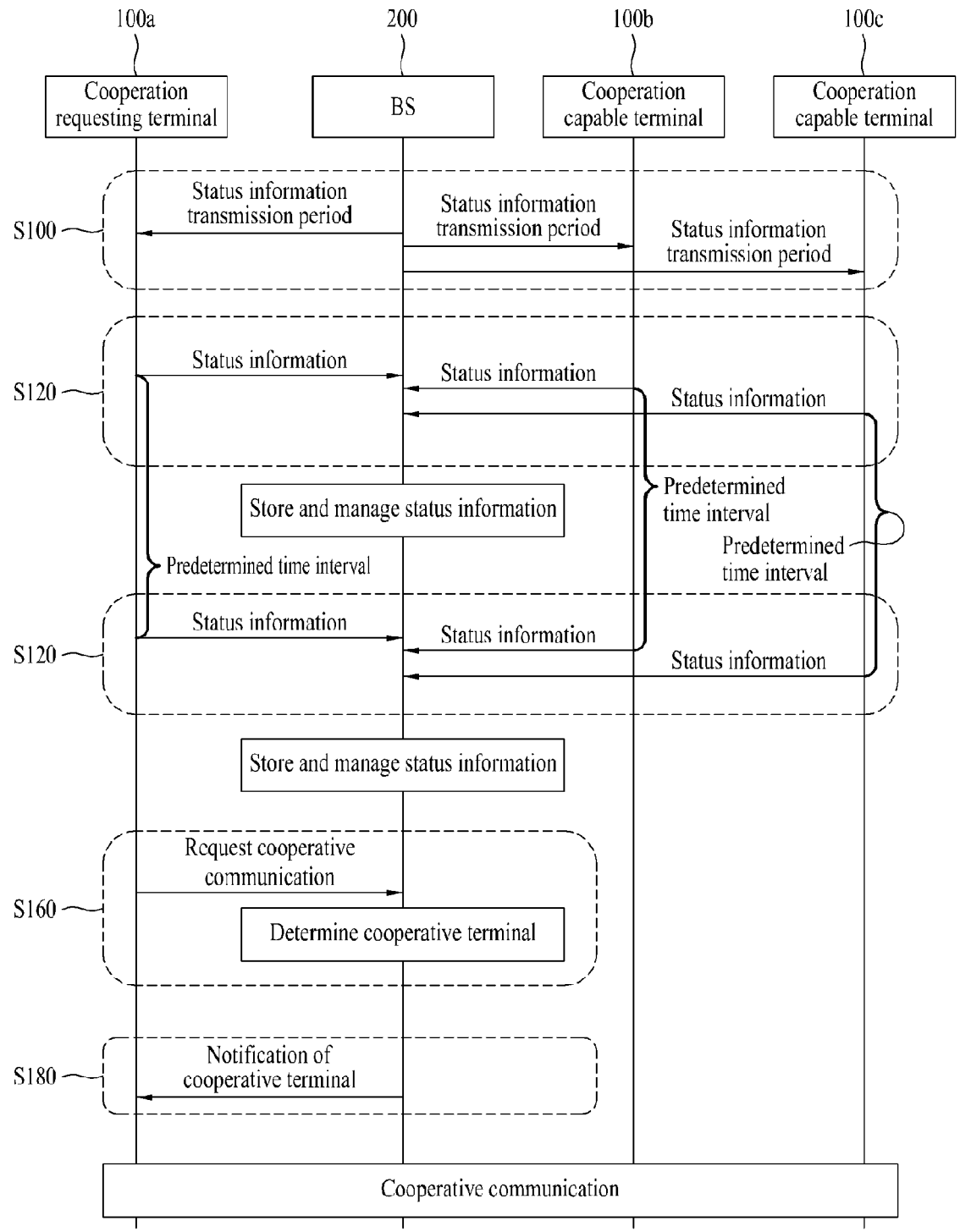
FIG. 7 is a diagram showing another modified example of the method shown in FIG. 6.

FIG. 7 is a diagram showing another modified example of the method shown in FIG. 6.

The BS 200 may broadcast or multicast information about a predetermined time interval (period) at which the cooperation capable terminals 100a, 100b and 100c will transmit the status information (S100). The cooperation capable terminals 100a, 100b and 100c which receive the information about the time interval may periodically transmit the status information thereof (S120).

The subsequent process is the same as described above with reference to FIG. 6.

Modified Example of the Process Shown in FIG. 7

If a cooperative terminal in a stationary state has an external power source, status information excluding information as to whether the terminal is currently performing cooperative communication is not changed. In this case, the terminal may transmit the status information thereof only when initially entering a cell and may not transmit the status information unless the BS requests the status information. Although information as to whether each terminal performs cooperative communication may be changed, this information may be checked by the BS without separate reporting of the terminal. Therefore, the BS may determine a cooperative terminal without additional status information.

Accordingly, the terminal (e.g., 100c) having an external power source in a stationary state among the cooperation capable terminals 100a, 100b and 100c may transmit the status information to the BS 200 only when initially entering a cell and may not transmit the status information at a predetermined time when the status information is transmitted. Thereafter, the terminal (e.g., 100c) may transmit the status information at a predetermined time when the status information is transmitted, if the terminal is in a moving state or if the external power source is removed. Even when the moving state of the terminal (e.g., 100c) and presence/absence of the external power source is not changed, if the terminal (e.g., 100c) receives a request for status information from the BS 200, the terminal may collect the status information thereof and transmit the status information to the BS 200.

The subsequent process after the BS 200 receives the status information of the cooperative terminals is the same as described with reference to FIG. 6.

Figure 8:
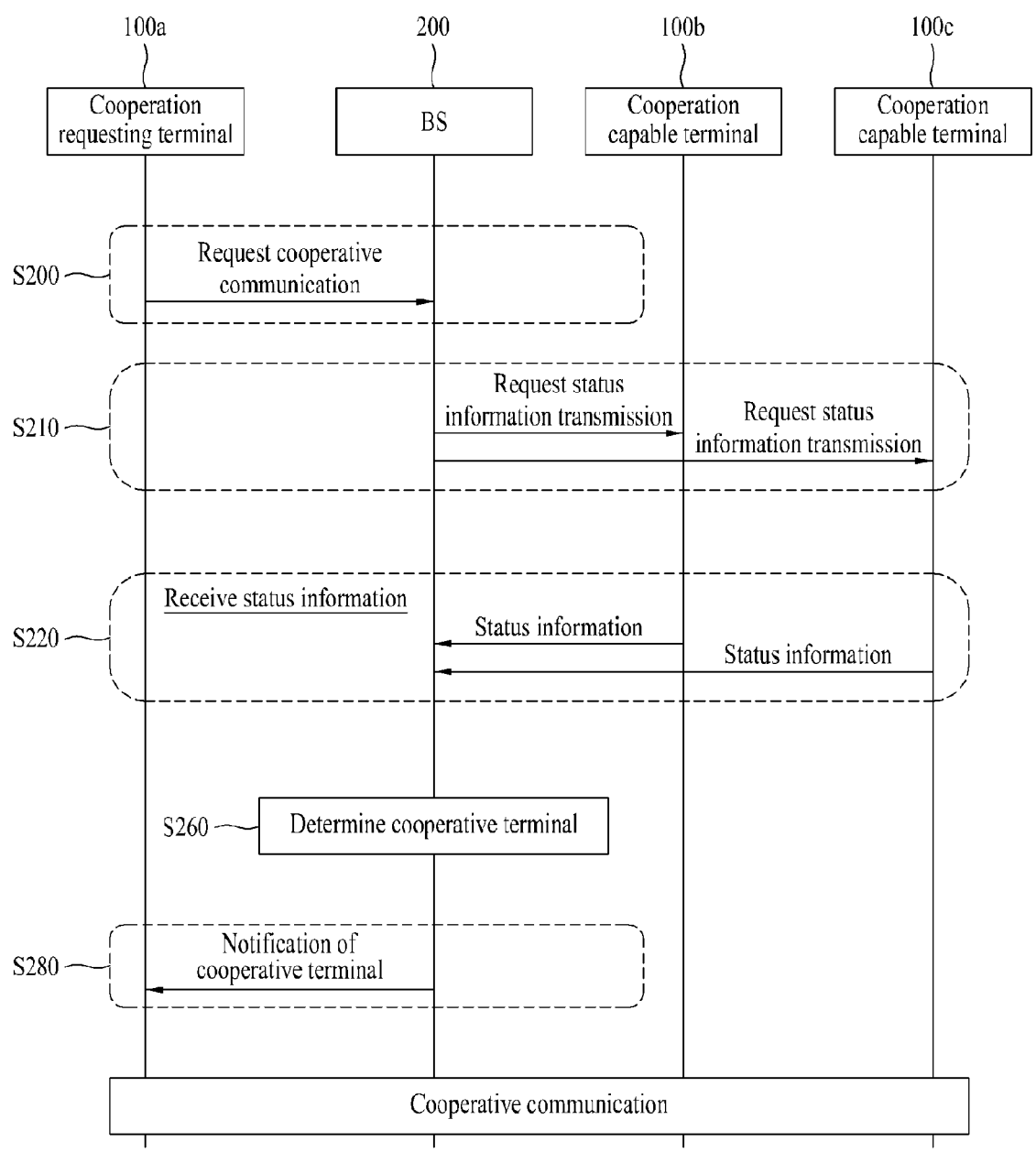
FIG. 8 is a diagram showing a method of, at a base station, receiving status information of each terminal and determining a cooperative terminal for a cooperation requesting terminal according to another embodiment of the present invention.

FIG. 8 is a diagram showing a method of, at a BS, receiving status information of each terminal and determining a cooperative terminal for a cooperation requesting terminal according to another embodiment of the present invention.

If a cooperative communication request is received from any one (100a) of cooperative communication capable terminals 100a, 100b and 100c at a certain time (S200), the BS 200 may transmit a status information request to cooperation capable terminals 100b and 100c other than a cooperation requesting terminal 100a (S210).

When the status information request is transmitted, the BS 200 may transmit one or more pieces of the reference information such that the cooperation capable terminals 100b and 100c in the cell consider the reference information when collecting the status information. The status information and the reference information have been described above.

The terminals 100b and 100c which receive the status information request may collect and transmit the current status information thereof to the BS (S220). The terminals 100b and 100c may transmit the status information using an existing channel or a separately defined channel. The terminals 100b and 100c may transmit the status information along with one or more pieces of control information when specific control information is transmitted.

The BS 200 may receive the status information from the terminals 100b and 100c (S220). The BS 200 may store and manage the received status information.

The BS 200 may determine a terminal which will cooperate with the cooperation requesting terminal 100a based on the status information (S260). In this case, the BS 200 may determine a cooperative terminal based on the status information transmitted by terminals, such as remaining battery amount of each terminal, mobility of the terminal, etc., as well as channel quality.

The BS 200 may configure, change and manage an algorithm for determining a cooperative terminal from the status information. For example, if it is determined that a specific terminal (e.g., 100b) is most suitable for cooperative communication with the cooperation requesting terminal 100a according to any one predetermined algorithm, the specific terminal (e.g., 100b) may be determined as the terminal which will cooperate with the cooperation requesting terminal 100a.

If the cooperative terminal is determined, the BS 200 may transmit a notification about the determined cooperative terminal to the cooperation requesting terminal (S280). According to the above example, the BS may notify the cooperation requesting terminal 100a of the determined cooperative terminal 100b.

The notification may include an ID, location information, etc. of the cooperative terminal 100b.

The cooperation requesting terminal 100a which receives the notification cooperates with the cooperative terminal 100b and transmits data to the BS. The cooperative terminal 100b may transmit data including the data of the cooperation requesting terminal 100a to the BS 200.

The embodiment shown in FIG. 8 may be implemented when the cooperative terminal is not efficiently determined using only the existing status information or in the event of an emergency.

The above-described embodiments and modified examples may be combined. Accordingly, the respective embodiments may be achieved by combination thereof when necessary rather than implemented alone. Those skilled in the art can easily implement such combination and, therefore, a detailed description of such combination will not be given. Nonetheless, such combination is not excluded from the present invention and should be interpreted as being included in the scope of the present invention.

The above embodiments and modified examples may be achieved by various means, for example, hardware, firmware, software, or a combination thereof.

In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and executed by a processor. The memory unit is located at the interior or exterior of the processor and may transmit data to and receive data from the processor via various known means.

For example, the methods according to the present invention may be stored in a storage medium (e.g. an internal memory, a flash memory, a hard disk, etc.) or may be implemented as code or commands within a software program which can be executed by a processor (e.g. a microprocessor).

Figure 9:
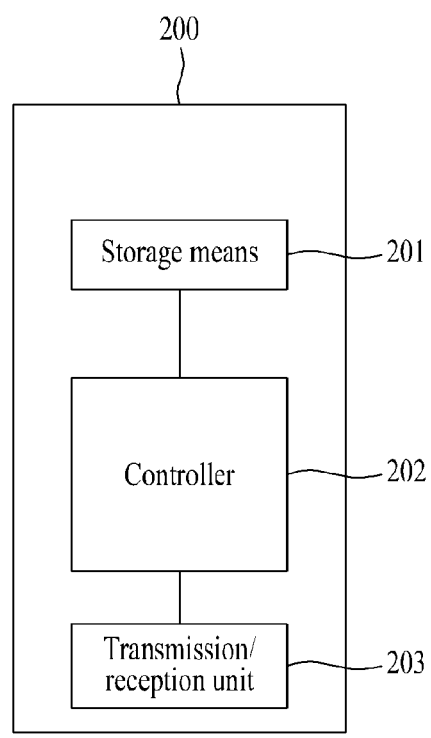
FIG. 9 is a block diagram showing the configuration of a base station according to the present invention.

FIG. 9 is a block diagram showing the configuration of a BS according to the present invention.

As shown in FIG. 9, the BS 200 includes a memory 201, a controller 202 and a transmission/reception unit 203.

The memory 201 stores the methods shown in FIGS. 1 to 8. The memory 201 may be located inside the controller 202 or may be configured as one component of the controller 202.

The transmission/reception unit 203 may receive the status information and the cooperative communication request from one or more of the cooperative terminals. In addition, the transmission/reception unit 203 may broadcast or multicast information about a time interval. The information about the time interval may be used to periodically receive the status information from the cooperative communication terminals.

The controller 202 controls the memory 201 and the transmission/reception unit 203. More specifically, the controller 202 executes the methods stored in the memory 201.

The controller 202 may control the transmission/reception unit 203 to receive the status information from one or more of the cooperative communication terminals according to a predetermined time interval. At this time, the controller 202 may control the transmission/reception unit 203 to transmit the status information request to the cooperative communication terminals at a predetermined time interval and receive the status information in response thereto. The controller 202 may control the transmission/reception unit 203 to receive the status information along with one or more pieces of control information when specific control information is received.

In addition, the controller 202 may control the transmission/reception unit 203 to transmit one or more pieces of the above-described reference information. The reference information may be considered when the cooperative terminal collects the status information.

The controller 202 determines the cooperative terminal based on the status information received from the transmission/reception unit 203. In this case, the controller 202 may determine the cooperative terminal based on the status information transmitted by terminals, such as remaining battery amount of the terminal, mobility of the terminal, etc., as well as channel quality.

The controller 202 may configure, change and manage an algorithm for determining a cooperative terminal from the above-described information.

The controller 202 transmits a notification about the cooperative terminal via the transmission/reception unit 203.

Figure 10:
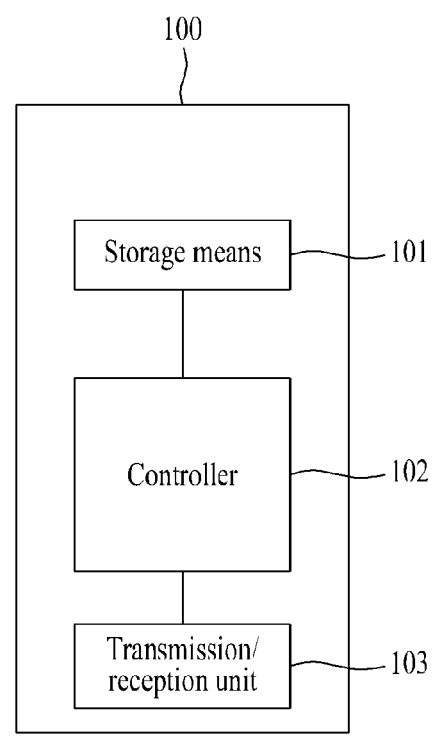
FIG. 10 is a block diagram showing the configuration of a terminal according to the present invention.

FIG. 10 is a block diagram showing the configuration of a terminal according to the present invention.

As shown in FIG. 10, the terminal 100 includes a memory 101, a controller 102 and a transmission/reception unit 103.

The memory 101 stores the methods shown in FIGS. 1 to 8. The memory 101 may be located inside the controller 102 or may be configured as one component of the controller 102.

The transmission/reception unit 103 may receive the status information request and the reference information from the BS 200. In addition, the transmission/reception unit 103 may receive broadcast or multicast information about a time interval. The information about the time interval may be used to periodically transmit status information.

The controller 102 controls the memory 101 and the transmission/reception unit 103. More specifically, the controller 102 executes the methods stored in the memory 101.

The controller 102 may collect the status information. The controller 102 may collect the status information at a predetermined time interval or when a request is received from the BS. In this case, the controller 102 may collect the status information in consideration of the reference information received from the BS 200. The status information collected by the controller 102 has been described above.

The controller 102 may control the transmission/reception unit 103 to transmit the collected status information to the BS 200. In this case, the controller 102 may control the transmission/reception unit 103 to transmit the status information at a predetermined time interval or in response to the status information request. In addition, if the terminal has an external power source in a stationary state, the controller 102 controls the transmission/reception unit 103 to transmit the collected status information to the BS 200 only when initially entering the cell.

The controller 102 controls the transmission/reception unit 103 to transmit the status information along with one or more pieces of control information when specific control information is transmitted.

If cooperative communication is requested, the controller 102 may control the transmission/reception unit 103 to transmit the cooperative communication request to the BS 200. In addition, the controller 102 may control the transmission/reception unit 103 to receive the information about the cooperative terminal determined by the BS 200.

The embodiments described hereinabove may be implemented in a storage medium which may be read by a computer or a similar apparatus thereto using software, hardware or a combination thereof, for example.

The exemplary embodiments described hereinabove are combinations of elements and features of the present invention. The elements or features should be considered selective unless explicitly mentioned otherwise. Each element or feature may be practiced without being combined with other elements or features. Further, an embodiment of the present invention may be constructed by combining parts of the elements and/or features. Operation orders described in the embodiments of the present invention may be rearranged. Some constructions or features of any one embodiment may be included in another embodiment and may be replaced with corresponding constructions or features of another embodiment. It will be obvious that claims that are not explicitly cited in the appended claims may be presented in combination as an exemplary embodiment of the present invention or included as a new claim by subsequent amendment after the application is filed.

In this specification, the exemplary embodiments of the present invention have been described centering on a data transmission/reception relationship between a BS and a terminal. Herein, the BS means a terminal node performing communication directly with a terminal. A specific operation described as performed by a BS may be performed by an upper node of the BS in some cases.

The term 'BS' may be replaced with the terms fixed station, Node B, eNodeB, access point, etc. The term 'terminal' may be replaced with the terms User Equipment (UE), Mobile Station (MS), Subscriber Station (SS), Mobile Subscriber Station (MSS), etc.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention. Further, claims which are not explicitly dependent on each other can be combined to provide an embodiment or new claims can be added through amendment after this application is filed.

The invention claimed is:

1. A method of determining a cooperative terminal at a base station (BS), the method comprising:
   transmitting, by the BS to one or more cooperative communication capable terminals, information about a time interval for periodically reporting status information;
   receiving, by the BS, the status information from the one or more cooperative communication capable terminals;
   determining, by the BS, a cooperative terminal based on the received status information, when the BS receives a cooperative communication request from a cooperation requesting terminal among the one or more cooperative communication capable terminals; and
   notifying, by the BS, the cooperation requesting terminal of the determined cooperative terminal,
   wherein the cooperative terminal transmits data of the cooperation requesting terminal to the BS by cooperating with the cooperation requesting terminal,
   wherein the status information comprises:
   first information about presence or absence of an external power source in the one or more cooperative communication capable terminals, and
   second information about a mobility of each of the one or more cooperative communication capable terminals,
   wherein when the first information of the status information indicates that the external power source is present in the one or more cooperative communication capable terminals and the second information of the status information indicates that the one or more cooperative communication capable terminals are in a fixed state, the status information is received only when the one or more cooperative communication capable terminals initially enter a cell, and
   wherein when the first information of the status information indicates that the external power source is not present in the one or more cooperative communication capable terminals or the second information of the status information indicates that the one or more cooperative communication capable terminals are not in the fixed state, the status information is periodically received at the time interval.

2. The method of claim 1, further comprising, before the receiving the status information, transmitting, to the one or more cooperative communication capable terminals, one or more of a list of the cooperative communication capable terminals, a list of terminal(s) requesting cooperative communication, a list of item(s) to be collected among the status information, and information associated with a radio channel.

3. The method of claim 2, wherein the information associated with the radio channel includes one or more of a list of radio access technology (RAT) to be used in inter-terminal communication, information about minimum power level for responding, information about path loss, information about a channel or a signal structure to be used to search for a neighboring terminal or a neighboring signal, and information about a reference channel, a signal structure or a timing value for reference timing for timing information configuration.

4. The method of claim 1, wherein the status information includes one or more of information about power of each cooperative communication capable terminal, information about channel status, information about performance, information about movement direction and speed, information about current location, information about probing result of a peripheral terminal, and information about channel status of a multi-radio access technology (RAT).

5. The method of claim 4, wherein the information about power includes one or more of remaining battery amount, current power consumption amount, processing power consumed for communication, and a power headroom value.

6. The method of claim 4, wherein the information about the channel status includes one or more of noise and interference level of all or part of downlink, and noise and interference level of all or part of uplink, a value set for timing advance of a terminal, and path loss to the BS.

7. The method of claim 4, wherein the information about performance includes modulation and coding scheme (MCS) level which can support transmission and reception, information as to whether cooperative communication is currently being performed, and available resources for cooperative communication.

8. The method of claim 4, wherein the information about the channel status of the multi-RAT includes one or more of noise and interference level of each channel, channel load state, and buffer state.

9. The method of claim 1, wherein the information about the time interval is broadcast or multicast to the one or more cooperative communication capable terminals.

10. The method of claim 1, further comprising, before the receiving the status information,
    receiving a cooperative communication request from at least one of the one or more cooperative communication capable terminals; and
    transmitting a status request to a terminal other than the at least one cooperation requesting terminal among the one or more cooperative communication capable terminals.

11. A base station (BS) comprising:
    a transceiver unit; and
    a controller operatively connected to the transceiver unit, wherein the controller is configured to:
    control the transceiver unit to transmit, to one or more cooperative communication capable terminals, information about a time interval for periodically reporting status information,
    control the transceiver unit to receive the status information from the one or more cooperative communication capable terminals,
    determine a cooperative terminal based on the received status information when the transceiver unit receives a cooperative communication request from a cooperation requesting terminal among the one or more cooperative communication capable terminals, and
    control the transceiver unit to notify the cooperation requesting terminal of the determined cooperative terminal,
    wherein the cooperative terminal transmits data of the cooperation requesting terminal to the BS by cooperating with the cooperation requesting terminal,
    wherein the status information comprises:
    first information about presence or absence of an external power source in the one or more cooperative communication capable terminals, and
    second information about a mobility of each of the one or more cooperative communication capable terminals,
    wherein when the first information of the status information indicates that the external power source is present in the one or more cooperative communication capable terminals and the second information of the status information indicates that the one or more cooperative communication capable terminals are in a fixed state, the status information is received only when the one or more cooperative communication capable terminals initially enter a cell, and wherein when the first information of the status information indicates that the external power source is not present in the one or more cooperative communication capable terminals or the second information of the status information indicates that the one or more cooperative communication capable terminals are not in the fixed state, the status information is periodically received at the time interval.

12. The BS of claim 11, wherein the information about the time interval is broadcast or multicast to the one or more cooperative communication capable terminals.

13. The BS of claim 11, wherein:
the controller controls the transceiver unit to transmit a status information request to at least one of the one or more cooperative communication capable terminals which are located in a cell.

14. A cooperative communication capable terminal having a capability of cooperating with another terminal to transmit data to a base station (BS), the cooperative communication capable terminal comprising:
a transceiver unit; and
a controller operatively connected to the transceiver unit, wherein the controller is configured to:
control the transceiver unit to receive, from the BS, information about a time interval for periodically reporting status information,
collect the status information,
control the transceiver unit to transmit the status information and a cooperative communication request to the BS, wherein a cooperative terminal is determined by the BS based on the status information, and
control the transceiver unit to receive a notification of the determined cooperative terminal,
wherein the cooperative terminal transmits data of the cooperative communication capable terminal to the BS by cooperating with the cooperative communication capable terminal,
wherein the status information comprises:
first information about presence or absence of an external power source in the cooperative communication capable terminal, and
second information about a mobility of the cooperative communication capable terminal,
wherein when the external power source is present in the cooperative communication capable terminal and the cooperative communication capable terminal is in a fixed state, the status information is transmitted only when the cooperative communication capable terminal initially enters a cell, and
wherein when the external power source is not present in the cooperative communication capable terminal or the cooperative communication capable terminal is not in a fixed state, the status information is periodically transmitted at the time interval.

15. The cooperative communication capable terminal of claim 14, wherein the controller controls the transceiver unit to receive a status information transmission request from the BS, and the collecting and transmitting of the status information is performed when the status information transmission request is received from the BS.

* * * * *